United States Patent
Li et al.

(10) Patent No.: US 11,983,118 B2
(45) Date of Patent: May 14, 2024

(54) METHOD AND APPARATUS FOR PARSING CONTIGUOUS SYSTEM ADDRESSES, AND ELECTRONIC DEVICE

(71) Applicant: MONTAGE TECHNOLOGY CO., LTD., Shanghai (CN)

(72) Inventors: Qiang Li, Shanghai (CN); Yi Li, Shanghai (CN); Liangliang Niu, Shanghai (CN); Dongjie Tang, Shanghai (CN); Yongjian Lv, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 219 days.

(21) Appl. No.: 17/560,204

(22) Filed: Dec. 22, 2021

(65) Prior Publication Data
US 2022/0214974 A1    Jul. 7, 2022

(30) Foreign Application Priority Data
Jan. 4, 2021  (CN) .......................... 202110003420.5

(51) Int. Cl.
*G06F 12/10* (2016.01)

(52) U.S. Cl.
CPC .................................. *G06F 12/10* (2013.01)

(58) Field of Classification Search
CPC ............. G06F 11/1072; G06F 12/0607; G06F 12/0246; G06F 12/00; G06F 2212/7208; G06F 13/1657; G06F 3/0679; G06F 12/0292; G06F 12/0802; G06F 12/10

USPC ......... 711/157, 103, E12.008, E12.079, 170, 711/E12.001, 154, 5
See application file for complete search history.

(56) References Cited

U.S. PATENT DOCUMENTS

| | | | | |
|---|---|---|---|---|
| 9,009,426 | B1* | 4/2015 | O'Brien, III | G06F 3/0608 711/170 |
| 2013/0117493 | A1* | 5/2013 | Skalsky | G06F 12/0646 711/E12.081 |
| 2017/0177224 | A1* | 6/2017 | Glover | G06F 3/0653 |
| 2019/0042464 | A1* | 2/2019 | Genshaft | G06F 12/0864 |
| 2019/0265976 | A1* | 8/2019 | Goryavskiy | G06F 9/3016 |

\* cited by examiner

*Primary Examiner* — Yaima Rigol
*Assistant Examiner* — Edward Waddy, Jr.
(74) *Attorney, Agent, or Firm* — IPRTOP LLC

(57) ABSTRACT

The present disclosure provides a method and apparatus for parsing contiguous system addresses, and an electronic device. The method for parsing contiguous system addresses comprises: acquiring system level information upon receiving contiguous system addresses; acquiring logical address ranges of objects in a first level based on the contiguous system addresses and the system level information; and when successively acquiring logical address ranges of objects in a second level, . . . , or an Nth level of the system, acquiring logical address ranges of objects in a present level based on a logical address range of a previous level and the system level information, wherein N is the number of levels, and N is an integer greater than or equal to 2, and a logical address range of an object comprises a start address and an end address of the object.

17 Claims, 8 Drawing Sheets

METHOD AND APPARATUS FOR PARSING CONTIGUOUS SYSTEM ADDRESSES, AND ELECTRONIC DEVICE

CROSS REFERENCE TO RELATED APPLICATION

The present application claims the benefit of priority to Chinese Patent Application No. CN 2021100034205, entitled "METHOD AND APPARATUS FOR PARSING CONTIGUOUS SYSTEM ADDRESSES, ELECTRONIC DEVICE, AND STORAGE MEDIUM", filed with CNIPA on Jan. 4, 2021, the disclosure of which is incorporated herein by reference in its entirety for all purposes.

FIELD OF TECHNOLOGY

The present disclosure generally relates to computer technology, in particular to the field of memory address technology, and specifically relates to a method and apparatus for parsing contiguous system addresses, and an electronic device.

BACKGROUND

Multi-level memory interleaving technology is designed to interleave accesses evenly across all memory channels so that memory channel bandwidths can be fully utilized while reducing the access load on each memory module. Memory interleaving technology may be implemented at multiple hardware levels, and there are often multiple configuration options for interleave granularities. Currently available memory interleaving technologies include, but are not limited to, multi-level interleaving such as processor interleaving, memory controller interleaving, memory channel interleaving, and rank interleaving of sets of memory chip bit widths. For example, if a system supports channel interleaving with a granularity of 4K bytes, every time the system address is increased by 4K bytes, it skips from one channel to the next channel. For addresses in a channel, if interleaving of sets of memory chip bit widths (aka ranks; "rank" denotes a certain set of memory chip bit widths; specifically, when the particle bit width multiplied by the number of particles is equal to 64 bits, the particles form a rank) with a granularity of 256 bytes is also supported, every time the address is increased by 256 bytes, it skips from one rank to another rank. As shown in FIG. 1, when a system address is input into a processor, it is successively parsed into a specific memory controller, a channel, a memory, and a rank according to address mapping logics on the processor. Different system addresses will be nearly randomly distributed over different ranks with the presence of multi-level memory interleaving technology.

Currently, processor manufacturers only provide single-point address parsing that parses a single point of a system memory address to a memory address. When a processor is to access a system memory address, the processor locates a specific row and column of a specific memory module according to single-point parsing logic and reads memory data therein. When detecting a memory error, the processor also uses the single-point parsing logic to locate the specific position of the memory with the error, thereby improving system reliability. However, currently it is relatively difficult to parse contiguous system addresses. For any address in a series of contiguous system addresses, it may undergo multiple-level interleaving, such as processor interleaving, memory channel interleaving, and memory module interleaving, as well as the influence of some other hardware configuration of the memory controller, and finally be parsed to a specific rank in a nearly random manner. For contiguous system addresses, each address is scanned in a circular manner, and then a single-point parsing provided by a processor manufacturer is performed to parse the contiguous system addresses, which has low performance efficiency. Moreover, time consumed by the algorithm of single-point parsing increases linearly with the expansion of the address range.

SUMMARY

The present disclosure provides a method for parsing contiguous system addresses, including the following steps: acquiring system level information upon receiving contiguous system addresses; acquiring logical address ranges of objects in a first level based on the contiguous system addresses and the system level information; and when successively acquiring logical address ranges of objects in a second level, ..., and an Nth level of the system, acquiring logical address ranges of objects in the present level based on a logical address range of the previous level and the system level information, wherein N is the number of levels, and N is an integer greater than or equal to 2, and the logical address ranges of the objects comprise start addresses and end addresses of the objects.

In an embodiment of the present disclosure, system level information includes the number of levels, interleaving enablement statuses of the levels, interleaving granularities of the levels, and the numbers of objects contained in the levels.

In an embodiment of the present disclosure, the acquiring logical address ranges of objects in a first level based on the contiguous system addresses and the system level information includes:

acquiring a start address of a first object in the first level based on a start address of the contiguous system addresses, acquiring start addresses of a second object, ..., and an Mth object in the first level by obtaining logical addresses corresponding to physical addresses obtained by progressively increasing from the start address of the contiguous system addresses, acquiring end addresses of the second object, ..., and the Mth object in the first level by obtaining logical addresses corresponding to physical addresses obtained by progressively increasing from the end address of the contiguous system addresses, wherein M is the number of objects in the first level.

In an embodiment of the present disclosure, the progressively increasing from the start address of the continuous system addresses includes:

when the interleaving enablement status of the first level is unenabled, progressively increasing from the start address of the contiguous system addresses based on the system configuration of each object in the first level and the contiguous system addresses; if the interleaving enablement status of the first level is enabled, progressively increasing from the start address of the contiguous system addresses based on the interleave granularity of the first level and the contiguous system addresses; when the interleaving enablement status of the first level is unenabled, progressively decreasing from the end address of the contiguous system addresses based on the interleave granularity of the first level and the contiguous system addresses; and when the interleaving enablement status of the first level is enabled, progressively decreasing from the end address of the contiguous system addresses based on the interleave granularity of the first level and the contiguous system addresses.

In an embodiment of the present disclosure, when a duplicate object is found in the first level by scanning or the acquired start address of an object exceeds the end address of the contiguous system addresses, the start address scanning of the first level is ended, and the acquisition of the start addresses of the objects in the first level is completed.

In an embodiment of the present disclosure, when a duplicate object is found in the first level by scanning or the acquired end address of an object exceeds the start address of the contiguous system addresses, the end address scanning of the first level is ended, and the acquisition of the end addresses of the objects in the first level is completed.

In an embodiment of the present disclosure, acquiring logical address ranges of objects in the present level based on a logical address range of the previous level and the system level information includes: acquiring a start address of a first object in the present level based on a start address of the logical address range of the previous level; acquiring start addresses of a second object, . . . , and a Kth object in the present level by obtaining addresses in the present level corresponding to addresses in the previous level obtained by progressively increasing from the start address of the logical address range of the previous level; acquiring an end address of the first object in the present level based on an end address in the logical address range of the previous level; and acquiring end addresses of the second object, . . . , and the Kth object in the present level by obtaining addresses in the present level corresponding to addresses in the previous level obtained by progressively decreasing from the end address of the logical address range of the previous level, where K is the number of objects in the present level.

In an embodiment of the present disclosure, progressively increasing the start address includes: if the interleaving enablement status of the present level is unenabled, progressively increasing from the start address based on system configuration of each object and logical addresses of the previous level; and if the interleaving enablement status of the present level is enabled, progressively increasing from the start address based on the interleave granularity of the present level; and progressively deceasing from the end address includes: if the interleaving enablement status of the present level is unenabled, progressively decreasing from the end address based on the system configuration of each object and the logical addresses of the previous level; and if the interleaving enablement status of the present level is enabled, progressively decreasing from the end address based on the interleave granularity of the present level.

In an embodiment of the present disclosure, when a duplicate object is found in the present level by scanning or the acquired start address of an object exceeds the end address in the logical address range of the previous level, the start address scanning of the present level is ended, and the acquisition of the start addresses of the objects in the present level is completed.

In an embodiment of the present disclosure, when a duplicate object is found in the present level by scanning or the acquired end address of an object exceeds the start address of the logical address range of the previous level, the end address scanning of the present level is ended, and the acquisition of the end addresses of the objects in the present level is completed.

In an embodiment of the present disclosure, the method further includes: detecting whether the start address of the contiguous system addresses and/or the logical address range of the previous level is an integer multiple of the interleave granularity of the corresponding level; and when the start address of the contiguous system addresses and/or the logical address range of the previous level is not an integer multiple of the interleave granularity of the corresponding level, increasing the address until reaching an integer multiple of the interleave granularity of the level.

In an embodiment of the present disclosure, the method further includes: detecting whether the end address of the contiguous system addresses and/or the logical address range of the previous level is equal to an integer multiple of the interleave granularity of the corresponding level minus 1; and when the end address of the contiguous system addresses and/or the logical address range of the previous level is equal to an integer multiple of the interleave granularity of the corresponding level minus 1, decreasing the address until reaching an integer multiple of the interleave granularity of the level.

The present disclosure further provides an apparatus for parsing contiguous system addresses, including:

a system level information acquisition module configured to acquire system level information upon receiving contiguous system addresses a logical address range acquisition module configured to acquire logical address ranges of objects in a first level based on the contiguous system addresses and the system level information, and when successively acquiring logical address ranges of objects in a second level, . . . , and an Nth level of the system, acquire logical address ranges of objects in a present level based on a logical address range of a corresponding previous level and the system level information, wherein N is the number of levels, and N is an integer greater than or equal to 2, wherein the logical address ranges of the objects comprise start addresses and end addresses of the objects.

In an embodiment of the present disclosure, the logical address range acquisition module includes: a start address acquisition unit configured to acquire a start address of a first object in the first level based on a start address of the contiguous system addresses, acquire start addresses of a second object, . . . , and an Mth object in the first level according to addresses corresponding to progressively increasing the start address, acquire a start address of a first object in the present level based on a start address of the logical address range of the previous level, and acquire start addresses of a second object, . . . , and a Kth object in the present level according to addresses corresponding to progressively increasing the start address, where M is the number of objects in the first level, and K is the number of objects in the present level; and an end address acquisition unit configured to acquire an end address of the first object in the first level based on an end address of the contiguous system addresses, acquire end addresses of the second object, . . . , and the Mth object in the first level according to addresses corresponding to progressively deceasing the end address, acquire an end address of the first object in the present level based on an end address in the logical address range of the previous level, and acquire end addresses of the second object, . . . , and the Kth object in the present level according to addresses corresponding to progressively deceasing the end address.

a start address acquisition unit configured to acquire a start address of a first object in the first level based on a start address of the contiguous system addresses, acquire start addresses of a second object, . . . , and an Mth object in the first level by obtaining logical addresses corresponding to physical addresses obtained by progressively increasing from the start address of the contiguous system addresses, acquire a start address of a first object in the present level based on a start address of a logical address range of the previous level, and acquire start addresses of a second object, . . . , and a Kth object in the present level by obtaining addresses in the present level corresponding to addresses in the previous level obtained by progressively increasing from the start address of the logical address range of the previous level, wherein M is the number of objects in the first level, and K is the number of objects in the present level; and an end address acquisition unit configured to acquire an end address of the first object in the first level based on an end address of the contiguous system addresses, acquire end addresses of the second object, . . . , and the Mth object in the first level by obtaining logical addresses corresponding to physical addresses obtained by progressively deceasing from the end address of the contiguous system addresses, acquire an end address of the first object in the present level based on an end address in the logical address range of the previous level, and acquire end addresses of the second object, . . . , and the Kth object in the present level obtaining addresses in the present level corresponding to addresses in the previous level obtained by progressively deceasing from the end address of the logical address range of the previous level.

In an embodiment of the present disclosure, the start address acquisition unit performs the following operations:

if the interleaving enablement status of the first level is unenabled, progressively increasing from the start address of contiguous system addresses based on system configuration of each object and the contiguous system addresses;

if the interleaving enablement status of the first level is enabled, progressively increasing from the start address of the contiguous system addresses based on the interleave granularity of the first level and the contiguous system addresses; and if the interleaving enablement status of the present level is unenabled, progressively increasing from the start address of the logical address range of the previous level based on system configuration of each object in the present level and logical addresses of the previous level; and if the interleaving enablement status of the present level is enabled, progressively increasing from the start address of the logical address range of the previous level based on the interleave granularity of the present level.

In the end address acquisition unit, when the interleaving enablement status of the first level is unenabled, the progressively decreasing from the end address of the contiguous system addresses is based on the system configuration of each object in the first level and the contiguous system addresses; if the interleaving enablement status of the first level is enabled, the progressively decreasing from the end address of the contiguous system addresses is based on the interleave granularity of the first level and the contiguous system addresses; when the interleaving enablement status of the present level is unenabled, the progressively decreasing from the end address of the logical address range of the previous level is based on the system configuration of each object in the present level; and when the interleaving enablement status of the present level is enabled, the progressively decreasing from the end address of the logical address range of the previous level is based on the interleave granularity of the present level.

In an embodiment of the present disclosure, the logical address range acquisition module further includes: a start address scanning unit configured to acquire the start addresses of the second object, . . . , and the Mth object in the first level by scanning, and when a duplicate object is found in the first level by scanning or the acquired start address of an object exceeds the end address of the contiguous system addresses, end the start address scanning of the first level, and complete the acquisition of the start addresses of the objects in the first level, and configured to successively acquire the start addresses of the second object, . . . , and the Kth object in the present level by scanning, and when a duplicate object is found in the present level by scanning or the acquired start address of an object exceeds the end address in the logical address range of the previous level, end the start address scanning of the present level, and complete the acquisition of the start addresses of the objects in the present level; and an end address scanning unit configured to successively acquire the end addresses of the second object, . . . , and the Mth object in the first level by scanning, and when a duplicate object is found in the first level by scanning or the acquired end address of an object exceeds the start address of the contiguous system addresses, end the end address scanning of the first level, and complete the acquisition of the end addresses of the objects in the first level, and configured to successively acquire the end addresses of the second object, . . . , and the Kth object in the present level by scanning, and when a duplicate object is found in the present level by scanning or the acquired end address of an object exceeds the start address of the logical address range of the previous level, end the end address scanning of the present level, and complete the acquisition of the end addresses of the objects in the present level.

In an embodiment of the present disclosure, the logical address range acquisition module further includes:

a multiple detection unit configured to detect whether the start address of the contiguous system addresses and/or the logical address range of the previous level is an integer multiple of the interleave granularity of the corresponding level, and whether the end address of the contiguous system addresses and/or the logical address range of the previous level is an integer multiple of the interleave granularity of the corresponding level; and a multiple adjustment unit configured to, when the start address of the contiguous system addresses and/or the logical address range of the previous level is not an integer multiple of the interleave granularity of the corresponding level, increase from the address until reaching an integer multiple of the interleave granularity of the level; when the start address of the contiguous system addresses and/or the logical address range of the previous level is an integer multiple of the interleave granularity of the corresponding level, decrease from the address until reaching an integer multiple of the interleave granularity of the level.

The present disclosure further provides an electronic device, including a memory configured to store a computer program; and a processor connected with the memory to run the computer program to implement the steps of the method for parsing contiguous system addresses as described above.

DETAILED DESCRIPTION

The following describes the implementation of the present disclosure through specific examples, and those skilled in the art can easily understand other advantages and effects of the present disclosure from the content disclosed in this specification. The present disclosure may also be implemented or applied through other different specific embodiments. Various details in this specification may also be modified or changed based on different viewpoints and applications without departing from the spirit of the present disclosure. It should be noted that the following embodiments and the features in the embodiments may be combined with each other if no conflict will result.

It should be noted that the drawings provided in this disclosure only illustrate the basic concept of the present disclosure in a schematic way, so the drawings only show the components related to the present disclosure. The drawings are not necessarily drawn according to the number, shape and size of the components in actual implementation; during the actual implementation, the type, quantity and proportion of each component may be changed as needed, and the components' layout may also be more complicated.

During single-point parsing of each system address of contiguous system addresses using the existing technology:

1) Each system address is parsed level by level (the levels include, but are not limited to, channels, and memory ranks, wherein the ranks are the last level) until it is parsed to a rank on a certain channel. A logical address may be computed at each level in the parsing process.

2) Regardless of whether interleaving of the levels is enabled or not and how large their interleaving granularities are, for the contiguous system memory addresses, the logical addresses computed at each level increase linearly, i.e., the logical addresses at the levels such as channels and ranks are contiguous.

3) When a single-point address continuously increases to an end address, or when parsed level objects are cyclically repeated, it means that all level objects have been scanned.

A method and apparatus for parsing contiguous system addresses, and an electronic device of the present disclosure are intended to solve the problem of low efficiency of single-point parsing of contiguous addresses in the prior art.

Figure 1:
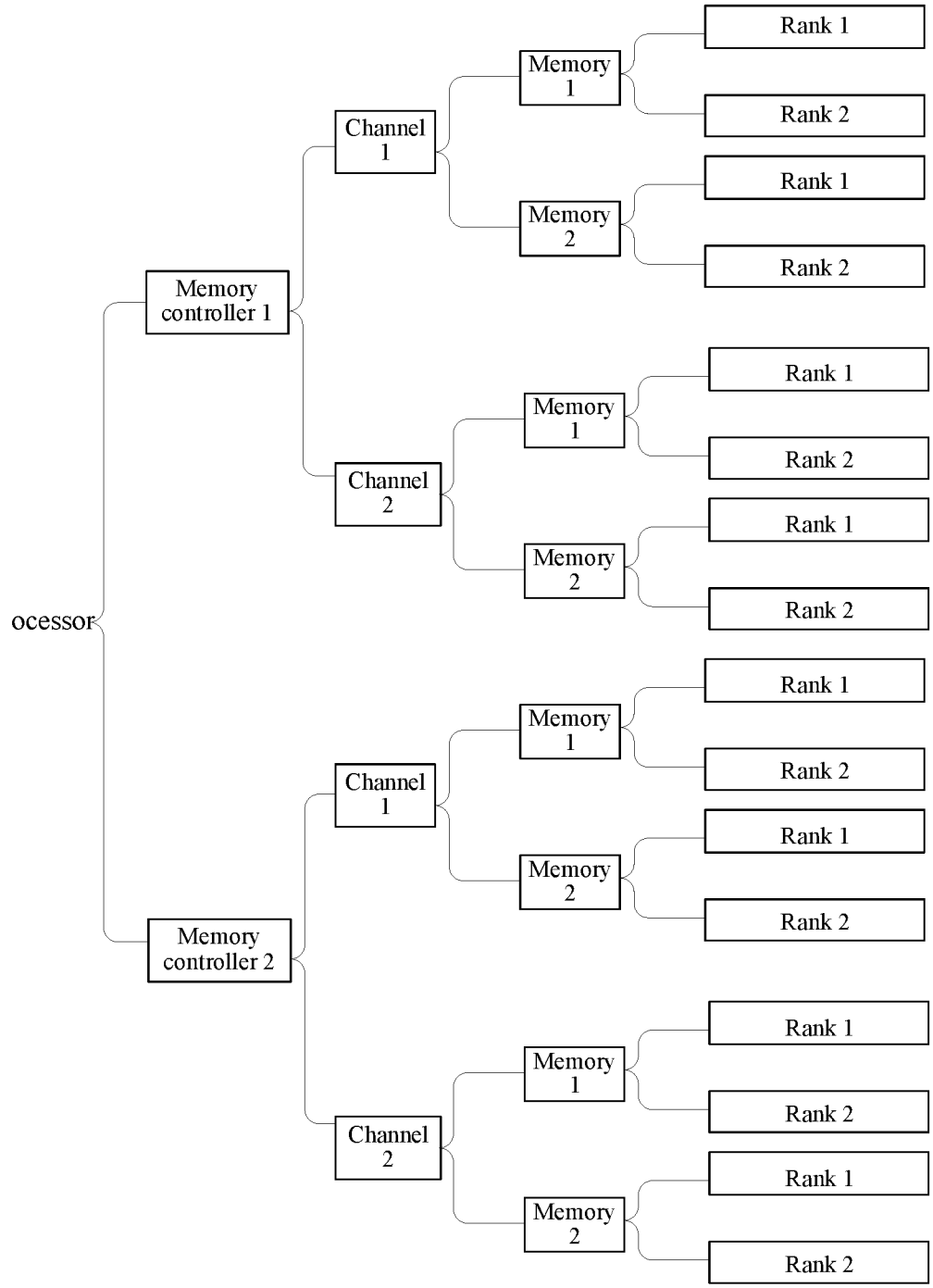
FIG. 1 is an architectural diagram of single-point system address parsing in the prior art.
Figure 2:
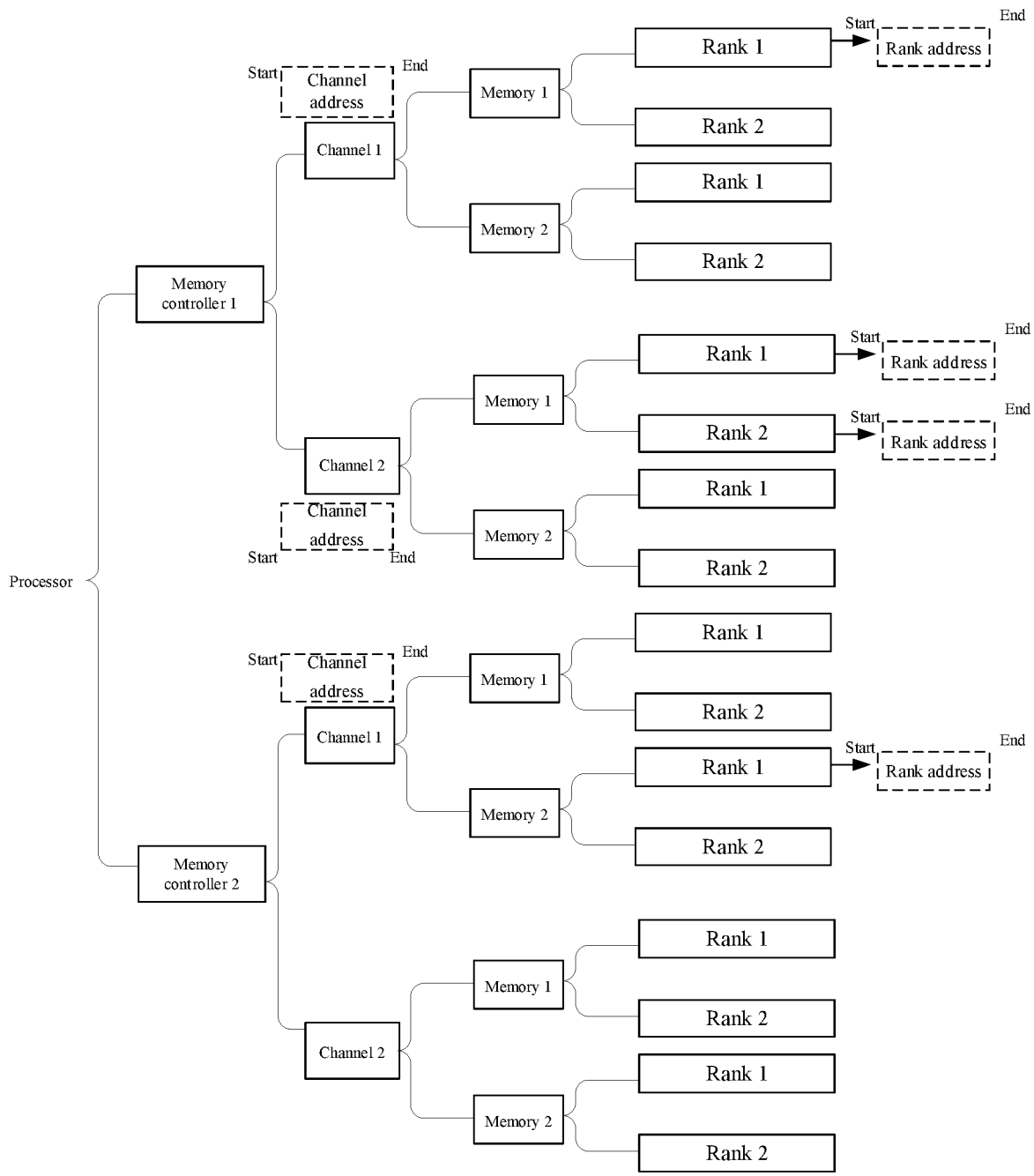
FIG. 2 is an diagram illustrating the application of a method for parsing contiguous system addresses according to an embodiment of the present disclosure.

FIG. 2 is a schematic diagram showing an application of a method for parsing contiguous system addresses of the present disclosure is applied. As shown in FIG. 2, a series of contiguous system addresses may be parsed to contiguous channel logical addresses on three different channels of two memory controllers (a memory controller 1 and a memory controller 2), for example, a channel 1 and a channel 2 of the memory controller 1, and a channel 1 of the memory controller 2, and then parsed to four different ranks, for example, a rank 1 of a memory 1 of the channel 1 of the memory controller 1, a rank 1 and a rank 2 of a memory 1 of the channel 2 of the memory controller 1, and a rank 1 of a memory 2 of the channel 1 of the memory controller 2. It is to be noted that FIG. 2 is used as an example only and the contiguous system addresses in the present application may be parsed to any one or more suitable memory controllers, channels, or ranks.

In this embodiment, an optimized method for parsing contiguous system addresses is proposed based on characteristics of the single-point parsing process described above.

The principles and implementations of the method for parsing contiguous system addresses, the apparatus, and the electronic device of the present disclosure will be described in detail below so that a person skilled in the art can understand the method for parsing contiguous system addresses, the apparatus, and the electronic device of this embodiment without creative work.

Embodiment 1

Figure 3:
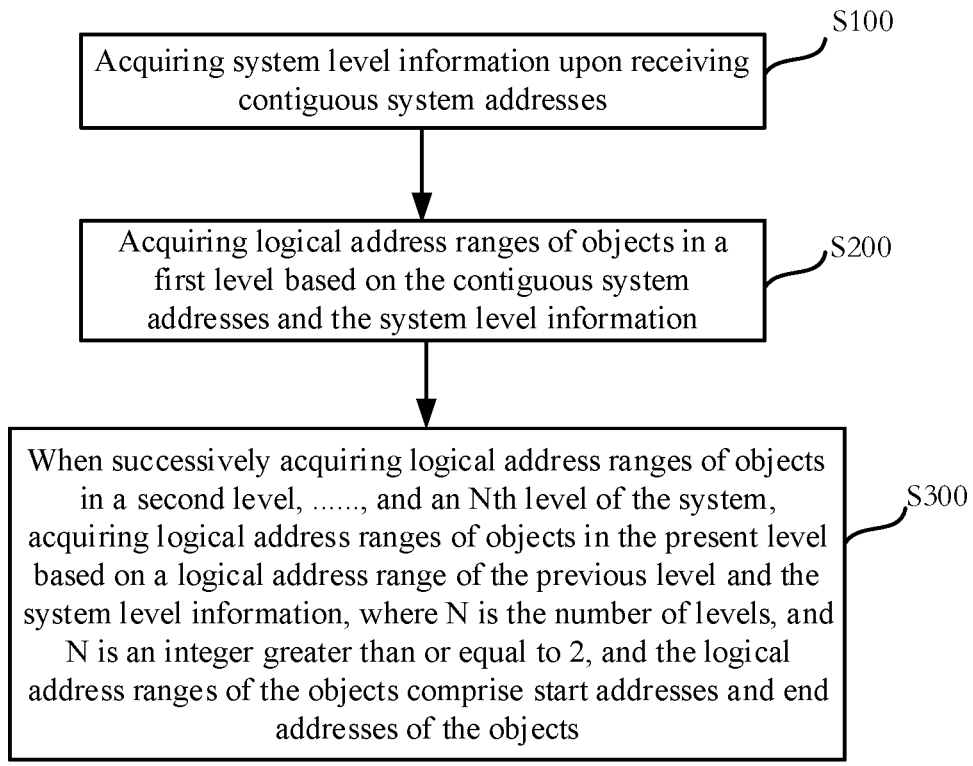
FIG. 3 shows an overall flow chart of a method for parsing contiguous system addresses according to an embodiment of the present disclosure.

This embodiment provides a method for parsing contiguous system addresses. FIG. 3 shows an overall flow diagram of the method for parsing contiguous system addresses according to an embodiment of the present disclosure. As shown in FIG. 3, the method for parsing contiguous system addresses of this embodiment includes the following steps:

Step S100, acquiring system level information upon receiving contiguous system addresses;

Step S200, acquiring logical address ranges of objects in a first level based on the contiguous system addresses and the system level information; and Step S300, acquiring logical address ranges of objects in the present level based on a logical address range of the previous level and the system level information, successively acquiring logical address ranges of objects in a second level, . . . , and an Nth level of the system, where N is the number of levels, and N is an integer greater than or equal to 2.

The above steps S100 to S300 in the method for parsing contiguous system addresses of this embodiment are described in detail below.

Step S100, acquiring system level information upon receiving contiguous system addresses.

In this embodiment, the system level information includes, but is not limited to, the number of levels, interleaving enablement statuses of the levels, interleaving granularities of the levels, and the numbers of objects contained in the levels.

Specifically, in some embodiments, levels of the system may include, for example, two levels: memory channels and ranks. In some embodiments, the system levels may include one or more levels. The interleaving enablement statuses of the levels include interleaving enabled and interleaving unenabled, wherein when interleaving is not enabled in a level, system configured logical address ranges of each object in the level are acquired, and the number of objects in each level is acquired, such as the number of channels in the system memory and the number of ranks in each channel.

Step S200, acquiring logical address ranges of objects in a first level based on the contiguous system addresses and the system level information.

In this embodiment, the contiguous system addresses are input to the first level.

Specifically, in this embodiment, start logical addresses of the objects and end logical addresses of the objects in the first level are acquired based on the contiguous system addresses and the system level information, respectively.

Figure 4:
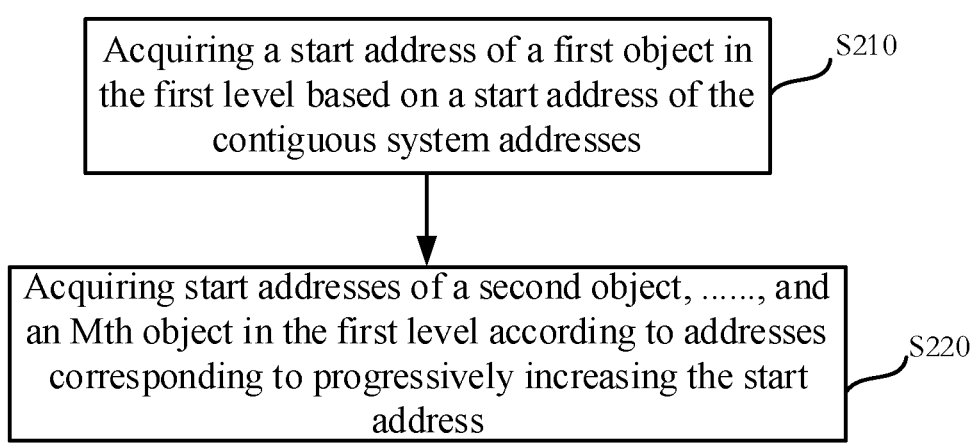
FIG. 4 shows a flow chart of acquiring start addresses of objects in a first level in a method for parsing contiguous system addresses according to an embodiment of the present disclosure.

As shown in FIG. 4, acquiring start logical addresses of logical address ranges of objects in a first level based on the contiguous system addresses and the system level information includes the following steps:

Step S210, acquiring a start logical address of a first object in the first level based on a start address of the contiguous system addresses.

Specifically, a start logical address of a first interleaving enabled object is calculated based on a start address of the contiguous system addresses and a single-point address parsing logic. The single-point address parsing logic uses any single-point address parsing method in the prior art.

This embodiment is described by using an example in which M is the number of objects in the first level, and K is the number of objects in any of a second level, . . . , and an Nth level. It is to be noted that for each of the second level, . . . , and the Nth level, the value of K may be the same or different.

Step S220, acquiring start addresses of a second object, . . . , and an Mth object in the first level by obtaining logical addresses corresponding to physical addresses obtained by progressively increasing from the start address of the contiguous system addresses, wherein M is the number of objects in the first level.

Specifically, the progressively increasing from the start address of the contiguous system addresses includes:

1) if the interleaving enablement status of the first level is not enabled, progressively increasing from the start address of contiguous system addresses based on system configuration of each object and the contiguous system addresses; and 2) if the interleaving enablement status of the first level is enabled, progressively increasing from the start address of the contiguous system addresses based on the interleave granularity of the first level and the contiguous system addresses.

In this embodiment, in successively acquiring the start addresses of the first object, . . . , and the Mth object in the first level, when a duplicate object is found in the first level by scanning or the acquired start address of an object exceeds the end address of the contiguous system addresses, the start address scanning of the first level is ended, and the acquisition of the start addresses of the objects in the first level is completed.

Particularly, in an embodiment of the present disclosure, Step S220 further includes: detecting whether the start address of the contiguous system addresses is an integer multiple of the interleave granularity of the first level; and when the start address of the contiguous system addresses is not an integer multiple of the interleave granularity of the corresponding level, increasing the address until reaching an integer multiple of the interleave granularity of the first level.

In other words, in this embodiment, if the interleaving is enabled for the first level and the start address of the contiguous system addresses is not an integer multiple of the interleave granularity, when increasing from the start address of the contiguous system addresses for the first time, a certain value is added to the start address of the contiguous system addresses so that the resulted address is an integer multiple of the interleave granularity of the level.

For example, the interleave granularity of the first level is 4K bytes, and the start address of the contiguous system addresses is 10K. The start address of the first object is calculated based on the single-point address parsing logic and the start address of the contiguous system addresses. Moreover, the start address 10K is not an integer multiple of the interleave granularity 4K bytes, and is increased to a proximal integer multiple address 12K at the first time of increasing, such that the address obtained after the increasing for the first time is an integer multiple of the interleave granularity. Then, the start address of the second object is calculated based on the single-point address parsing logic and the address obtained after increasing from the start address of the contiguous system addresses for the first time, i.e., 12K.

Figure 5:
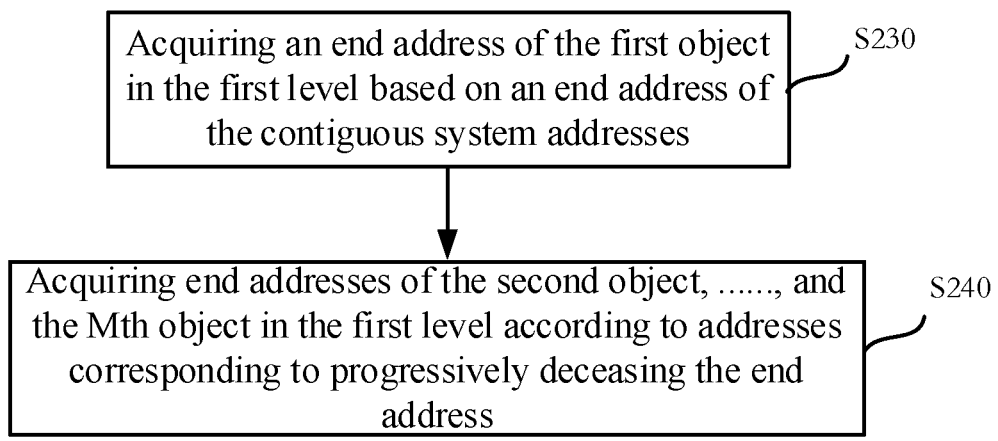
FIG. 5 shows a flow chart of acquiring end addresses of the objects in the first level in a method for parsing contiguous system addresses according to an embodiment of the present disclosure.

In this embodiment, as shown in FIG. 5, the acquiring end addresses of logical address ranges of objects in a first level based on the contiguous system addresses and the system level information includes the following steps:

Step S230, acquiring an end address of the first object in the first level based on an end address of the contiguous system addresses. Specifically, an end address of the first interleaving enabled object is calculated based on an end address of the contiguous system addresses and the single-point address parsing logic.

Step S240, acquiring end addresses of the second object, . . . , and the Mth object in the first level by obtaining logical addresses corresponding to physical addresses obtained by progressively deceasing from the end address of the contiguous system addresses.

Specifically, the progressively deceasing from the end address includes:

1) if the interleaving enablement status of the first level is unenabled, progressively decreasing from the end address based on system configuration of each object and the contiguous system addresses; and 2) if the interleaving enablement status of the first level is enabled, progressively decreasing from the end addresses based on the interleave granularity of the first level and the contiguous system addresses.

In this embodiment, in successively acquiring the end addresses of the first object, . . . , and the Mth object in the first level, when a duplicate object is found in the first level by scanning or the acquired end address of an object exceeds the start address of the contiguous system addresses, the end address scanning of the first level is ended, and the acquisition of the end addresses of the objects in the first level is completed.

Particularly, the method for parsing contiguous system addresses of this embodiment further includes: detecting whether the end address of the contiguous system addresses is equal to an integer multiple of the interleave granularity of the first level minus 1; and when the end address of the contiguous system addresses is not equal to an integer multiple of the interleave granularity of the first level minus 1, decreasing from the end address until reaching to an integer multiple of the interleave granularity of the previous level.

In other words, in this embodiment, if the interleaving is enabled for the first level and the end address of the contiguous system addresses is not equal to an integer multiple of the interleave granularity of the first level minus 1, when decreasing from the end address of the contiguous system addresses for the first time, a certain vale is subtracted from the end address of the contiguous system addresses so that the resulted address plus 1 is an integer multiple of the interleave granularity of the level.

For example, the interleave granularity of the first level is 4K bytes, and the end address of the contiguous system addresses plus 1 is 22K, which is not an integer multiple of the interleave granularity 4K bytes, so the end address is decreased to an integer multiple 20K of the interleave granularity at the first time of decreasing, so the end address for next scanning is 22K−1. Then, the end address of the second object is calculated based on the single-point address parsing logic and the address obtained after decreasing from the end address of the contiguous system addresses for the first time. (The end address of the contiguous system addresses corresponds to the end address of the first object).

It is to be noted that in this embodiment, in acquiring the logical address ranges of the objects in the first level, step S210 of acquiring a start address of a first object in the first level may be executed before step 230, or step S230 of acquiring an end address of the first object in the first level may be executed before step S210; in addition, step S210 and step S230 may also be executed at the same time: acquiring the start address and the end address of the first object in the first level at the same time.

Similarly, in acquiring the logical address ranges of the second object, . . . , and the Mth object in the first level, start addresses of the objects may be acquired before end addresses of the objects, or the end addresses of the objects may be acquired before the start addresses of the objects, or the processes of acquiring the start addresses and the end addresses of the objects may be executed at the same time.

Step S300, acquiring logical address ranges of objects in a present level (any of a second level, . . . , and an Nth level) based on a logical address range of the corresponding previous level and the system level information, thereby successively acquiring logical address ranges of objects in the second level, . . . , and the Nth level of the system, wherein N is the number of levels, and N is an integer greater than or equal to 2. For example, logical address ranges of objects in an ith level are acquired based on logical address ranges of an (i-1th) level and the system level information, wherein i=2, 3, . . . , N.

In this embodiment, inputs to the second level, . . . , and the Nth level are the logical address ranges of corresponding previous levels.

Figure 6:
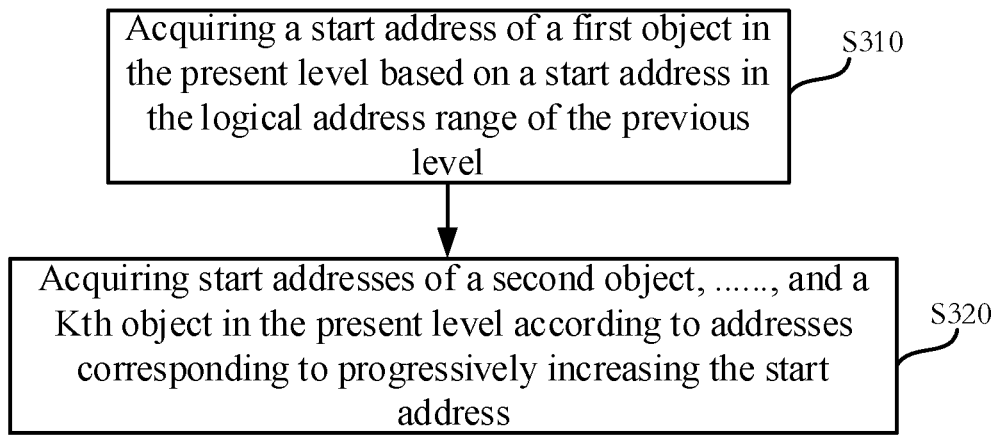
FIG. 6 shows a flow chart of acquiring start addresses of objects in a second level, . . . , and an Nth level in a method for parsing contiguous system addresses according to an embodiment of the present disclosure.

As shown in FIG. 6, if the interleaving enablement status of the present level is enabled, acquiring start addresses in logical address ranges of objects in the present level based on a logical address range of the previous level and the system level information includes the following steps:

Step S310, acquiring a start address of a first object in the present level based on a start address of the logical address range of the previous level.

Specifically, a start address of a first interleaving enabled object in the present level is calculated based on a start address of the logical address range of the previous level and the single-point address parsing logic.

Step S320, acquiring start addresses of a second object, . . . , and a Kth object in the present level by obtaining addresses in the present level corresponding to addresses in the previous level obtained by progressively increasing from the start address of the logical address range of the previous level, wherein K is the number of objects in the previous level.

Specifically, progressively increasing from the start address includes:

1) if the interleaving enablement status of the present level is unenabled, progressively increasing from the start address based on system configuration of each object of the present level and logical addresses of the previous level; and 2) if the interleaving enablement status of the present level is enabled, progressively increasing from the start address based on the interleave granularity of the present level.

In this embodiment, in successively acquiring the start addresses of the first object, . . . , and the Kth object in the present level, when a duplicate object is found in the present level by scanning or the acquired start address of an object exceeds the end address in the logical address range of the previous level, the start address scanning of the present level is ended, and the acquisition of the start addresses of the objects in the present level is completed.

Particularly, in an embodiment of the present disclosure, the method further includes: detecting whether the start address of the contiguous system addresses is an integer multiple of the interleave granularity of the present level; and when the start address of the contiguous system addresses is not an integer multiple of the interleave granularity of the corresponding level, increasing from the address until reaching an integer multiple of the interleave granularity of the level.

In other words, in this embodiment, if the interleaving is enabled for the present level and the start address of the previous level is not an integer multiple of the interleave granularity of the present level, when increasing from the start address of the previous level, a certain vale is added to the start address of the previous level, so that the resulted address is an integer multiple of the interleave granularity of the level.

For example, the interleave granularity of the second level is 4K bytes, and the start address of the first level is 10K. The start address of the first level 10K is not an integer multiple of the interleave granularity 4K bytes of the second level, and therefore when increasing from the start address 10K for the first time, 2K is added so that the result address is 12K, so that the address obtained after increasing from the start address 10K for the first time is an integer multiple (i.e., 12K) of the interleave granularity (i.e., 4K) of the second level. Then, the start address of the second object in the second level is calculated based on the address obtained (i.e., 12K) after increasing from increasing from the start address 10K for the first time and the single-point address parsing logic. (The start address of the first object in the second level is calculated based on the start address 10K).

Figure 7:
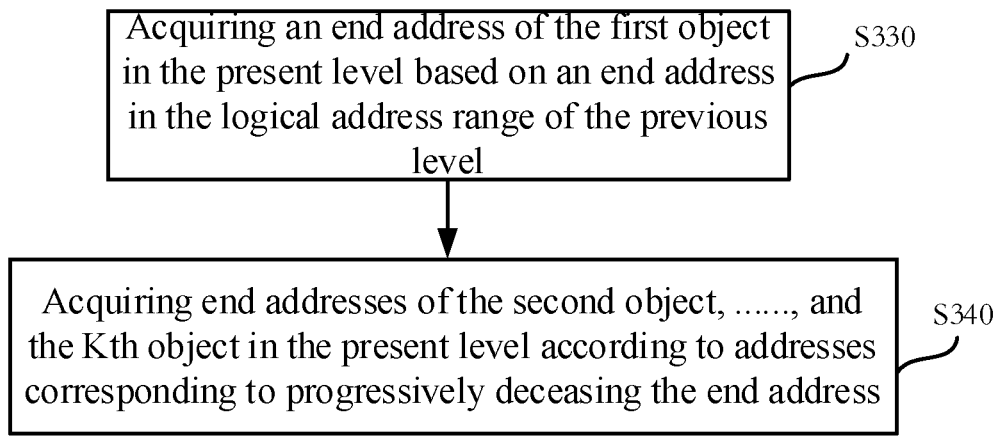
FIG. 7 shows a flow chart of acquiring end addresses of the objects in the second level, . . . , and the Nth level in a method for parsing contiguous system addresses according to an embodiment of the present disclosure.

In this embodiment, as shown in FIG. 7, if the interleaving enablement status of the present level is enabled, acquiring end addresses in logical address ranges of objects in the present level based on a logical address range of the previous level and the system level information includes:

Step S330, acquiring an end address of the first object in the present level based on an end address in the logical address range of the previous level.

Specifically, an end address of the first interleaving enabled object is calculated based on an end address in the logical address range of the previous level and the single-point address parsing logic.

Step S340, acquiring end addresses of the second object, . . . , and the Kth object in the present level by obtaining addresses in the present level corresponding to addresses in the previous level obtained by progressively deceasing from the end address of the logical address range of the previous level.

Specifically, progressively deceasing from the end address includes:

1) if the interleaving enablement status of the present level is unenabled, progressively decreasing from the end address based on the system configuration of each object of the present level; and 2) if the interleaving enablement status of the present level is enabled, progressively decreasing from the end address based on the interleave granularity of the present level.

In this embodiment, in successively acquiring the end addresses of the first object, . . . , and the Kth object in the present level (any of the second level, . . . , and the Nth level), when a duplicate object is found in the present level by scanning or the acquired end address of an object exceeds the start address of the logical address range of the previous level, the end address scanning of the present level is ended, and the acquisition of the end addresses of the objects in the present level is completed.

Particularly, in an embodiment of the present disclosure, the method further includes: detecting whether the end address of the logical address range of the previous level is equal to an integer multiple of the interleave granularity of the present level minus 1; and when the end address of the contiguous system addresses is equal to not an integer multiple of the interleave granularity of the corresponding level minus 1, decreasing the address until reaching an integer multiple of the interleave granularity of the present level.

In other words, in this embodiment, if the interleaving is enabled for the present level and the end address of the logical address range of the previous level is not equal to an integer multiple of the interleave granularity of the present level minus 1, when decreasing from the end address of the logical address range of the previous level for the first time, a certain vale is subtracted from the end address so that the resulted address is an integer multiple of the interleave granularity of the present level.

For example, the interleave granularity of the second level is 4K bytes, and the end address of the previous level plus 1 is 22K, which is not an integer multiple of the interleave granularity 4K bytes. So the end address is decreased to an integer multiple 20K of the interleave granularity at the first time of decreasing, so the end address for the next scanning is 22K−1. Then, the end address of the second object is calculated based on the address obtained after the decrease for the first time and the single-point address parsing logic.

It is to be noted that in this embodiment, in acquiring the logical address ranges of the objects in the present level, step S310 of acquiring a start address of a first object in the present level may be executed before step 330, or step S330 of acquiring an end address of the present object in the first level may be executed before step S310; in addition, step S310 and step S330 may also be executed at the same time: acquiring the start address and the end address of the first object in the present level at the same time.

Similarly, in acquiring the logical address ranges of the second object, . . . , and the Kth object in the present level, start addresses of the objects may be acquired before end addresses of the objects, or the end addresses of the objects may be acquired before the start addresses of the objects, or the processes of acquiring the start addresses and the end addresses of the objects may be executed at the same time.

To enable a person skilled in the art to further understand the method for parsing contiguous system addresses of this embodiment, the implementing process of the method for parsing contiguous system addresses of this embodiment is described below with specific examples.

Figure 8:
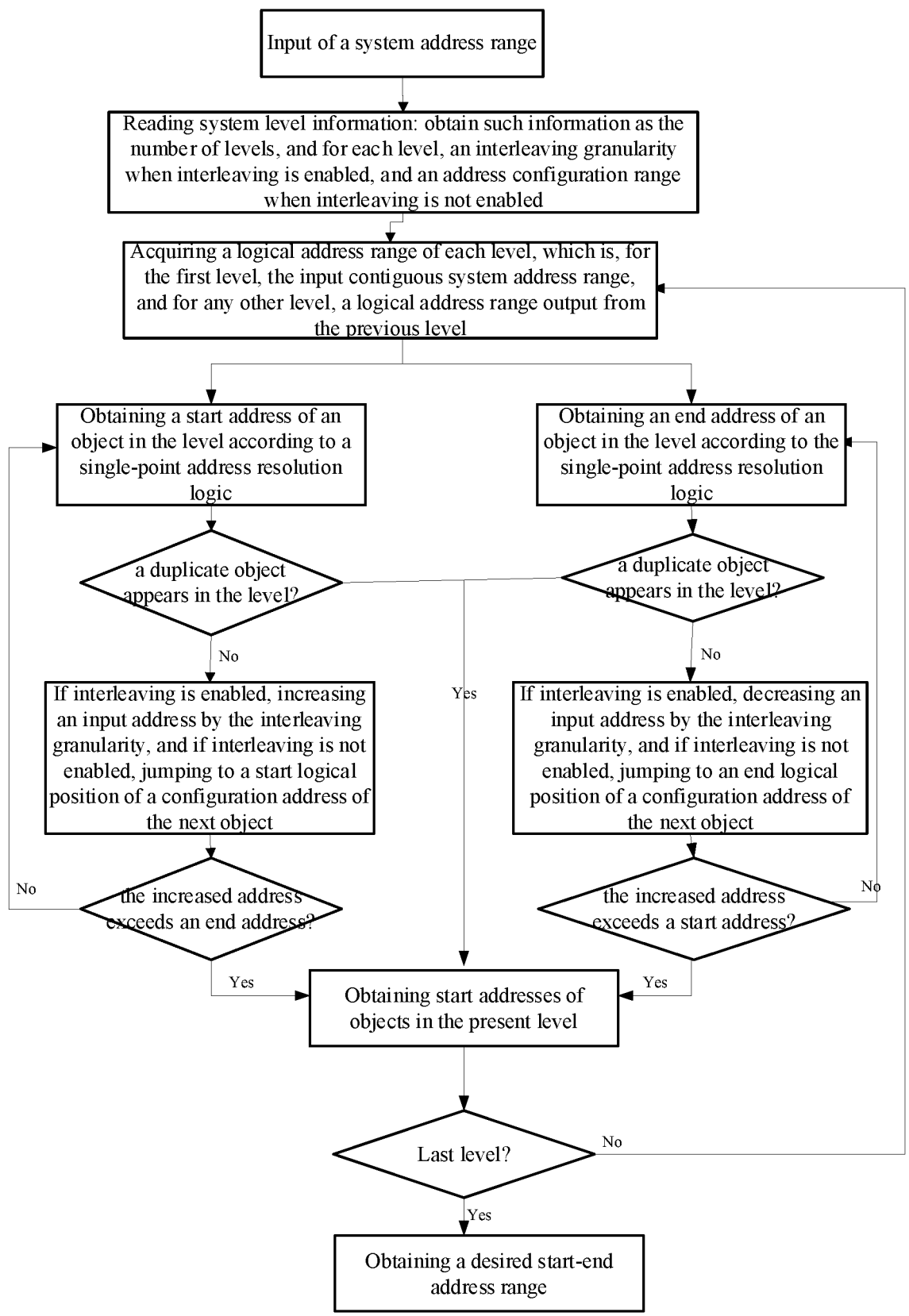
FIG. 8 shows an overall implementation flow chart of a method for parsing contiguous system addresses according to an embodiment of the present disclosure.

As shown in FIG. 8, an input of a contiguous system address range is received and system level information is read to obtain such information as the number of levels, an interleave granularity for each level when interleaving is enabled, and an address configuration range when interleaving is not enabled.

A logical address range of each level is acquired. For the first level, the contiguous system address range is input, and for any other level, a logical address range output from a corresponding previous level is input.

For each level, start addresses and end addresses of objects are acquired respectively.

The above two processes may be performed in sequence or simultaneously.

In the acquisition of the start addresses of the objects, the start address of an object in the level is obtained according to a single-point address parsing logic; whether a duplicate object begins to appear in the level is determined; if so, subsequent processes are ended to obtain the start address of the objects in the present level; if not, whether interleaving is enabled in the present level is further determined; if interleaving is enabled, an input address is progressively increased by the interleave granularity of the present level, and if interleaving is not enabled, the process jumps to a start logical position of a configuration address the next object, and then whether the increased address exceeds an end address is detected; if so, configuration of the start addresses of the objects in the level is ended; if not, the start address of the next object in the level is further obtained according to the single-point address parsing logic, and the above process is repeated to accomplish the acquisition of the start addresses of the objects in the level.

In the acquisition of the end addresses of the objects, the end address of an object in the level is obtained according to the single-point address parsing logic; whether a duplicate object begins to appear in the level is determined; if so, the subsequent process is ended to obtain the end address of the objects in the present level; if not, whether interleaving is enabled in the present level is further determined; if interleaving is enabled, an input address is progressively decreased by the interleave granularity, and if interleaving is not enabled, the process jumps to an end logical position of a configuration address of the next object, and then whether the decreased address exceeds a start address is detected; if so, configuration of the end addresses of the objects in the level is ended; if not, the end address of the next object in the level is further obtained according to the single-point address parsing logic, and the above process is repeated to accomplish the acquisition of the end addresses of the objects in the level.

After the start addresses and the end addresses of the objects in the level are acquired, logical address ranges of the objects in the level are acquired.

Then the above process is repeated for logical address ranges of the objects in the next level, until logical address ranges of all levels in the system are acquired to obtain logical address ranges of the ranks.

Figure 9:
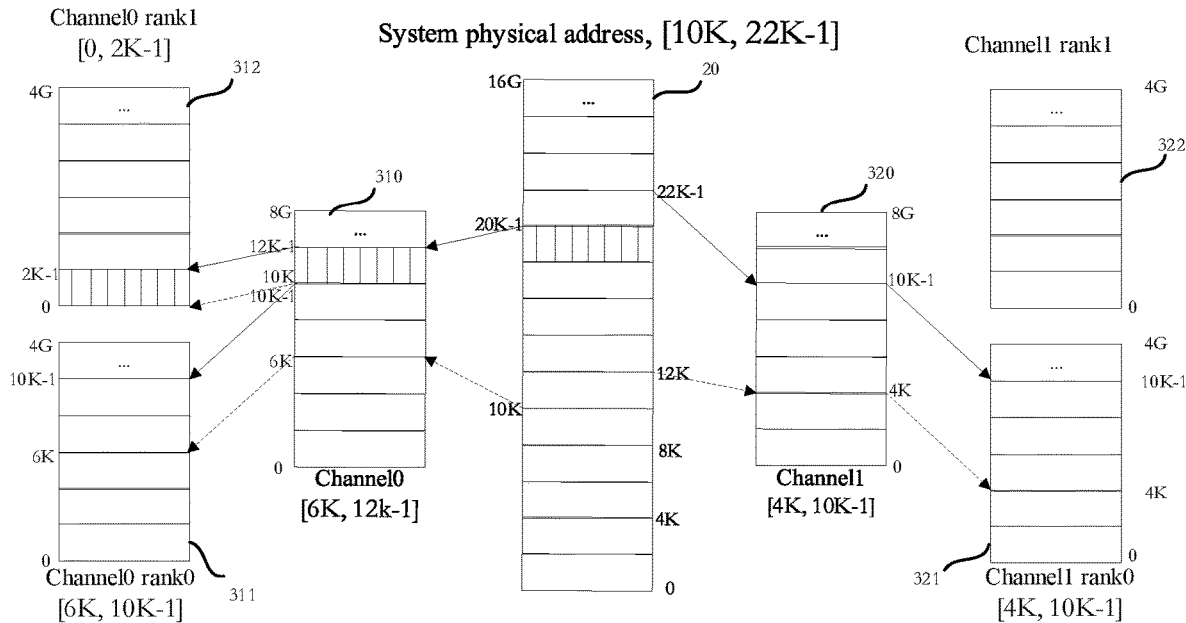
FIG. 9 shows a specific address parsing example using a method for parsing contiguous system addresses according to an embodiment of the present disclosure.

FIG. 9 shows a specific address parsing example using the method for parsing contiguous system addresses in this embodiment.

Suppose a system has 2 memory channels, each channel being connected to a memory 20 of 16 GB with 2 ranks, and interleaving is enabled for the memory channel level and the rank level. Now it is desired to calculate logical address ranges of the ranks in a contiguous system address range [10K, 22K−1].

In a first step, system level information is acquired. The system includes the channel level and the rank level, wherein the number of system levels is 2, and the interleaving is enabled for both levels. The system enables interleaving of the two levels (channels and ranks), wherein the channel level is a first level, and the rank level is a second level. In the channel level, the number of channels is 2, including a first channel 310 and a second channel 320, and the interleave granularity of the channel level is 4K bytes. In the rank level, the number of ranks is 4, and the interleave granularity of the rank level is 10K bytes.

In a second step, logical address ranges of objects in the first level are acquired based on the contiguous system addresses and the system level information. Start-end logical address ranges of objects in the level of the first channel 310 and the second channel 320 are calculated to obtain a logical address range [6K, 12K−1] of the first channel 310 and a logical address range [4K, 10K−1] of the second channel 320. The specific process is as follows:

1) Start addresses of the channel level are calculated. A start address of the first channel 310 is calculated to be 6K according to the start address 10K in the contiguous system addresses. The contiguous system address is increased to 12K, which is an integer multiple of the interleave granularity of the channel level, and a start address of the second channel 320 is calculated to be 4K according to the system address 12K. When all objects in the channel level are scanned, the scanning is ended.

2) End addresses of the first channel 310 are calculated. An end address of the second channel 320 is calculated to be 10K−1 according to the end address 22K−1 in the contiguous system addresses. The system end address is decreased to 20K−1, whose value plus 1 is an integer multiple of the interleave granularity of the channel level, and an end address of the first channel 310 is calculated to be 12K−1 according to the system address 20K−1. When all objects in the channel level are scanned, the scanning is ended.

In a third step, logical address ranges of objects in the second level are acquired based on the logical address ranges of the first level and the system level information. Logical address ranges of objects in the rank level are calculated to obtain an address range [6K, 10K−1] of a first rank 311 of the first channel 310, an address range [0K, 2K−1] of a second rank 312 of the first channel 310, and an address range [4K, 10K−1] of a first rank 321 of the second channel 320. The specific process is as follows:

1) Start addresses of the corresponding ranks of the first channel 310 are calculated. A start address of the first rank 311 of the first channel 310 is calculated to be 6K according to the start position 6K of the first channel 310. The start address of the first channel 310 is increased to 10K, which is an integer multiple of the interleave granularity of the rank level, and a start address of the second rank 312 of the first channel 310 is calculated to be 0K according to the address 10K in the first channel 310. When the two ranks of the first channel in the second level are both scanned, the scanning is ended.

2) End addresses of the corresponding ranks of the first channel 310 are calculated. An end address of the second rank 312 of the first channel 310 is calculated to be 2K−1 according to the end address 12K−1 of the first channel 310. The end address of the first channel 310 is decreased to 10K−1, whose value plus 1 is an integer multiple of the interleave granularity of the rank level, and an end address of the first rank 311 of the first channel 310 is calculated to be 10K−1 according to the address 10K−1. When the two ranks of the first channel in the second level are both scanned, the scanning is ended.

3) Start addresses of the corresponding ranks of the second channel 320 are calculated. A start address of the first rank 322 of the second channel 320 is calculated to be 4K according to the start address 4K of the second channel 320. The start address of the second channel 320 is increased to 10K, which is an integer multiple of the interleave granularity of the rank level, which exceeds the end address 10K−1 of the second channel 320, so there is no need to further scan the second rank 321 of the second channel 320, and the scanning is ended.

4) End addresses of the corresponding ranks of memory chip bit widths of the second channel 320 are calculated. An end address of the first rank 322 of the second channel 320 is calculated to be 10K−1 according to the end address 10K−1 of the second channel 320. The end address of the second channel 320 is decreased by the integer multiple of the interleave granularity (10K) to −1, which exceeds to the start address 0 of the second channel 320, so there is no need to further scan the second rank 321 of the second channel 320, and the scanning is ended.

Therefore, when the method for parsing contiguous system addresses of this embodiment is used to parse the contiguous system addresses, the algorithm consumes a fixed amount of time, which does not increase with the increase of the contiguous system address range, thus effectively improving the efficiency of contiguous system address parsing.

Embodiment 2

Figure 10:
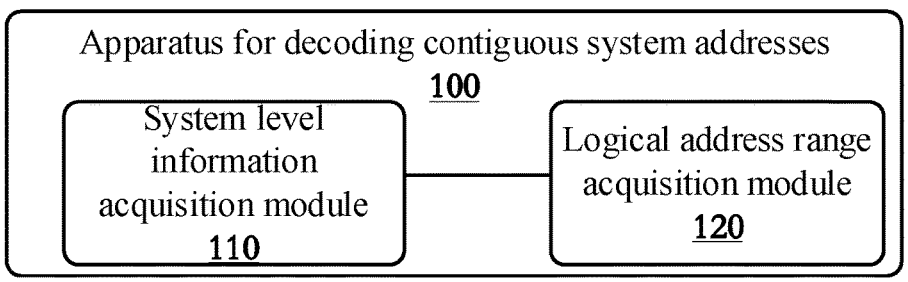
FIG. 10 shows a block diagram of an apparatus for parsing contiguous system addresses according to an embodiment of the present disclosure.

This embodiment provides an apparatus for parsing contiguous system addresses. FIG. 10 shows a block diagram of the apparatus 100 for parsing contiguous system addresses in this embodiment. As shown in FIG. 10, the apparatus 100 for parsing contiguous system addresses in this embodiment includes a system level information acquisition module 110 and a logical address range acquisition module 120.

In this embodiment, the system level information acquisition module 110 is configured to acquire system level information upon receiving contiguous system addresses.

In this embodiment, the system level information includes, but is not limited to, the number of levels, interleaving enablement statuses of the levels, interleaving granularities of the levels, and the numbers of objects contained in the levels.

Specifically, the number of levels in a given system address parsing process is acquired, e.g., two levels composed of memory channels, and ranks. For each level, the interleaving enablement status (interleaving enabled or interleaving unenabled) and interleave granularity (specific value) are acquired. When interleaving is unenabled, system configured logical address ranges of objects in the levels are acquired, and the number of objects in each level is acquired, such as how many channels are in the system memory and how many ranks of memory chip bit widths are in each channel.

In this embodiment, the logical address range acquisition module 120 acquires logical address ranges of objects in a first level based on the contiguous system addresses and the system level information, and when successively acquiring logical address ranges of objects in a second level, . . . , and an Nth level of the system, acquires logical address ranges of objects in the present level based on a logical address range of the previous level and the system level information, where N is the number of levels, and N is an integer greater than or equal to 2, and the logical address ranges of the objects include start addresses and end addresses of the objects.

Figure 11:
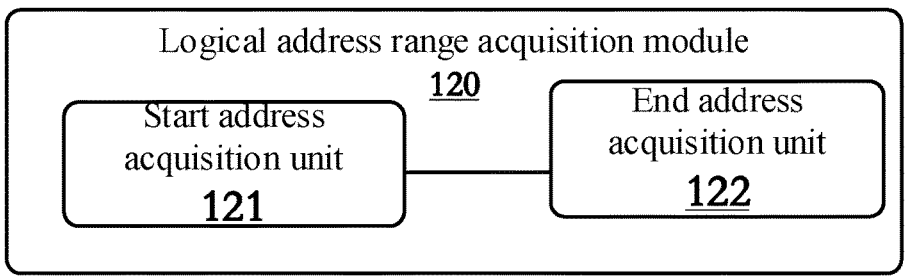
FIG. 11 shows a block diagram of a logical address range acquisition module in an apparatus for parsing contiguous system addresses according to an embodiment of the present disclosure.

Specifically, as shown in FIG. 11, in this embodiment, the logical address range acquisition module 120 includes a start address acquisition unit 121 and an end address acquisition unit 122.

This embodiment is described by using an example in which M is the number of objects in the first level, and K is the number of objects in any of a second level, . . . , and an Nth level. It is to be noted that for each of the second level, . . . , and the Nth level, the value of K may be same or different.

In this embodiment, the start address acquisition unit 121 is configured to acquire a start address of a first object in the first level based on a start address of the contiguous system addresses, acquire start addresses of a second object, . . . , and an Mth object in the first level by obtaining logical addresses corresponding to physical addresses obtained by progressively increasing from the start address of the contiguous system addresses, acquire a start address of a first object in the present level based on a start address of a logical address range of the previous level, and acquire start addresses of a second object, . . . , and a Kth object in the present level by obtaining addresses in the present level corresponding to addresses in the previous level obtained by progressively increasing from the start address of the logical address range of the previous level, wherein M is the number of objects in the first level, and K is the number of objects in the present level; and Specifically, in the start address acquisition unit 121:

if the interleaving enablement status of the first level is unenabled, the progressively increasing from the start address of contiguous system addresses is based on system configuration of each object and the contiguous system addresses;

if the interleaving enablement status of the first level is enabled, the progressively increasing from the start address of the contiguous system addresses is based on the interleave granularity of the first level and the contiguous system addresses;

if the interleaving enablement status of the present level is unenabled, the progressively increasing from the start address of the logical address range of the previous level is based on system configuration of each object in the present level and logical addresses of the previous level; and if the interleaving enablement status of the present level is enabled, the progressively increasing from the start address of the logical address range of the previous level is based on the interleave granularity of the present level.

In this embodiment, an end address acquisition unit 122 is configured to acquire an end address of the first object in the first level based on an end address of the contiguous system addresses, acquire end addresses of the second object, . . . , and the Mth object in the first level by obtaining logical addresses corresponding to physical addresses obtained by progressively deceasing from the end address of the contiguous system addresses, acquire an end address of the first object in the present level based on an end address in the logical address range of the previous level, and acquire end addresses of the second object, . . . , and the Kth object in the present level obtaining addresses in the present level corresponding to addresses in the previous level obtained by progressively deceasing from the end address of the logical address range of the previous level.

Specifically, in the end address acquisition unit 122:

if the interleaving enablement status of the first level is unenabled, the progressively decreasing from the end address of the contiguous system addresses is based on the system configuration of each object and the contiguous system addresses;

if the interleaving enablement status of the first level is enabled, the progressively decreasing from the end address of the contiguous system addresses is based on the interleave granularity of the first level and the contiguous system addresses;

if the interleaving enablement status of the present level is unenabled, the progressively decreasing from the end address of the logical address range of the previous level is based on the system configuration of each object in the present level; and if the interleaving enablement status of the present level is enabled, the progressively decreasing from the end address of the logical address range of the previous level is based on the interleave granularity of the present level.

Figure 12:
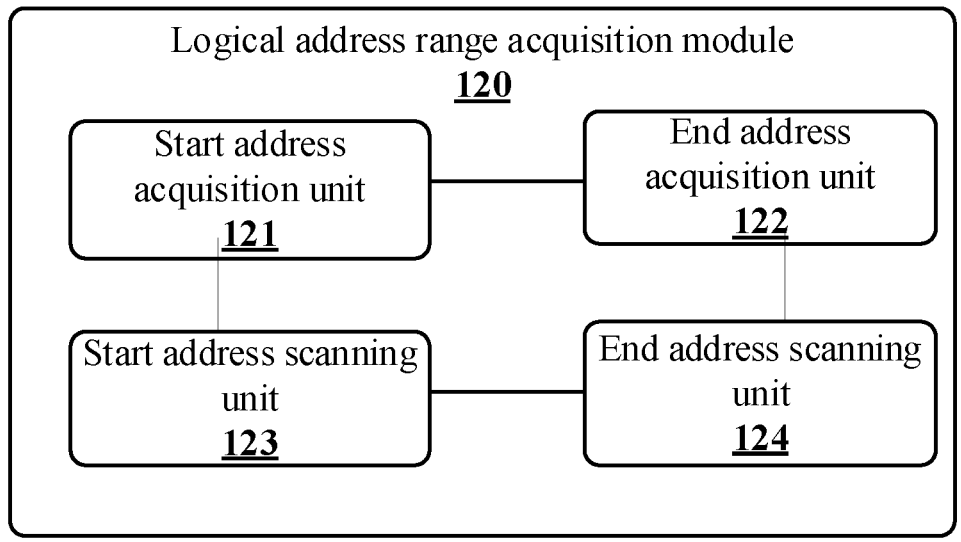
FIG. 12 shows a preferred block diagram of a logical address range acquisition module in an apparatus for parsing contiguous system addresses according to an embodiment of the present disclosure.

As shown in FIG. 12, in this embodiment, the logical address range acquisition module 120 further includes a start address scanning unit 123 and an end address scanning unit 124.

In this embodiment, the start address scanning unit 123 is configured to acquire the start addresses of the first object, . . . , and the Mth object in the first level by scanning, and when a duplicate object is found in the first level by scanning or the acquired start address of an object exceeds the end address of the contiguous system addresses, end the start address scanning of the first level, and complete the acquisition of the start addresses of the objects in the first level, and configured to successively acquire the start addresses of the first object, . . . , and the Kth object in the present level (any of the second level, . . . , and the Nth level) by scanning, and when a duplicate object is found in the present level by scanning or the acquired start address of an object exceeds the end address in the logical address range of the previous level, end the start address scanning of the present level, and complete the acquisition of the start addresses of the objects in the present level (any of the second level, . . . , and the Nth level).

In other words, in this embodiment, if interleaving is enabled for the level and the start address of the contiguous system addresses and/or the previous level is not an integer multiple of the interleave granularity of the present level, when increasing from the start address of the contiguous system addresses and/or the logical address range of the previous level for the first time, a certain vale is added to the start address so that the resulted address is an integer multiple of the interleave granularity of the present level.

In this embodiment, the end address scanning unit 124 is configured to successively acquire the end addresses of the second object, . . . , and the Mth object in the first level by scanning, wherein when a duplicate object is found in the first level by scanning or an acquired end address of an object exceeds the start address of the contiguous system addresses, end address scanning of the first level ends, at which time acquisition of the end addresses of the objects in the first level is completed, wherein the end address scanning unit is further configured to successively acquire the end addresses of the first object, . . . , and the Kth object in the present level by scanning, wherein when a duplicate object is found in the present level by scanning or an acquired end address of an object exceeds the start address of the logical address range of the previous level, end address scanning of the present level ends, at which time acquisition of the end addresses of the objects in the present level is completed.

In this embodiment, if interleaving is enabled for the level and the end address of the contiguous system addresses and/or the previous level is not equal to an integer multiple of the interleave granularity of the present level minus 1, when decreasing from the end address of the logical address range of the previous level for the first time, a certain vale is subtracted from the end address so that the resulted address plus 1 is an integer multiple of the interleave granularity of the present level.

Figure 13:
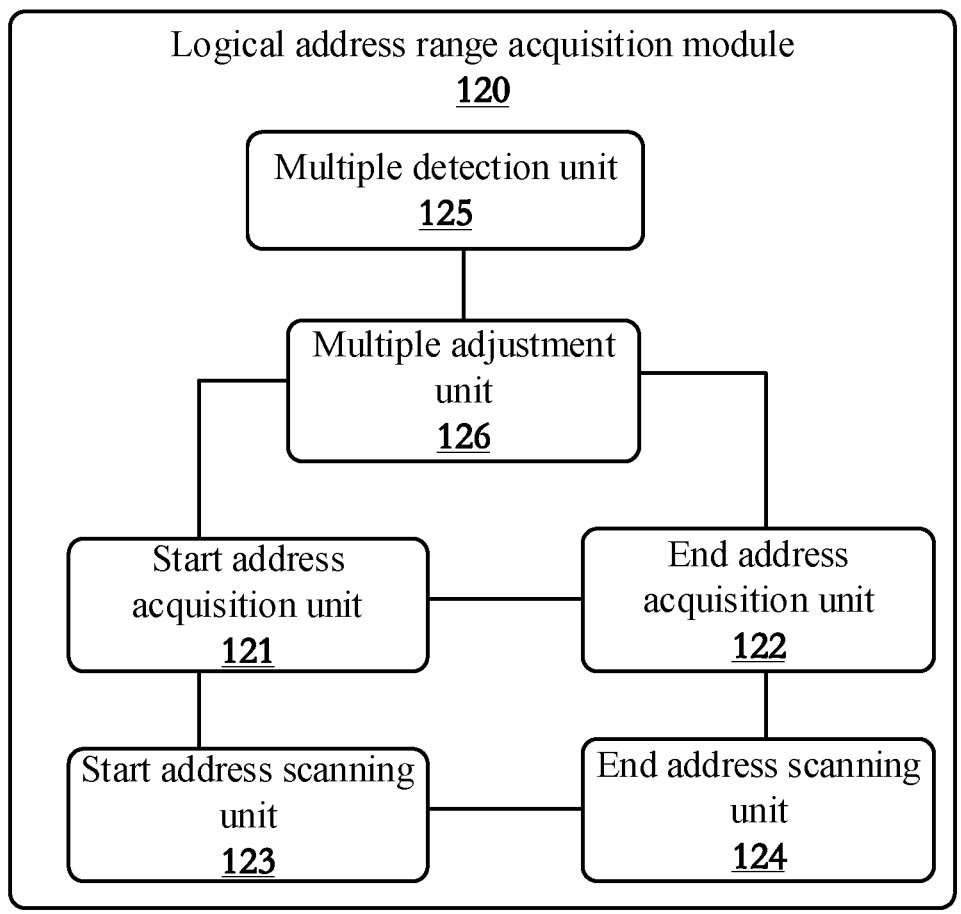
FIG. 13 shows another preferred block diagram of a logical address range acquisition module in an apparatus for parsing contiguous system addresses according to an embodiment of the present disclosure.

As shown in FIG. 13, in this embodiment, the logical address range acquisition module 120 further includes a multiple detection unit 125 and a multiple adjustment unit 126.

In this embodiment, the multiple detection unit 125 is configured to detect whether the start address of the contiguous system addresses and/or the logical address range of the previous level is an integer multiple of the interleave granularity of the corresponding level, and whether the end address of the contiguous system addresses and/or the logical address range of the previous level is an integer multiple of the interleave granularity of the corresponding level.

In this embodiment, a multiple adjustment unit 126 is configured to, when the start address of the contiguous system addresses and/or the logical address range of the previous level is not an integer multiple of the interleave granularity of the corresponding level, increase from the address until reaching an integer multiple of the interleave granularity of the level; when the start address of the contiguous system addresses and/or the logical address range of the previous level is an integer multiple of the interleave granularity of the corresponding level, decrease from the address until reaching an integer multiple of the interleave granularity of the level.

Technical features specifically implemented by the apparatus 100 for parsing contiguous system addresses in this embodiment are substantially same as principles of the method for parsing contiguous system addresses in Embodiment 1, and technical contents that can be used in both the method and the apparatus are repeated here.

Embodiment 3

Figure 14:
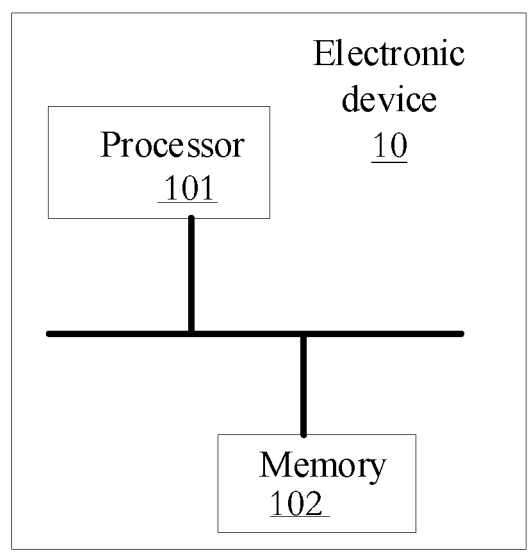
FIG. 14 shows a schematic structure diagram of an electron device according to an embodiment of the present disclosure.

As shown in FIG. 14, this embodiment further provides an electronic device 10. The electronic device 10 includes a memory 102 configured to store a computer program; and a processor 101 configured to execute the computer program to implement the steps of the method for parsing contiguous system addresses as described in Embodiment 1.

The memory 102 is connected to and communicates with the processor 101 through an apparatus bus, and the memory 102 is configured to store the computer program, and the processor 101 is configured execute the computer program to enable a user terminal 200 to perform the method for parsing contiguous system addresses.

It should also be noted that the apparatus bus mentioned above may be a peripheral component interconnect (PCI) bus, an extended industry standard architecture (EISA) bus, or the like. The apparatus bus may be divided into an address bus, a data bus, a control bus, and the like. The communication interface is configured to implement communication between a database access apparatus and other devices (such as clients, read-write libraries and read-only libraries). The memory 102 may include a random access memory (RAM), and may also include a non-volatile memory, such as at least one disk memory.

The above-mentioned processor 101 may be a general-purpose processor, including a central processing unit (CPU), a network processor (NP), or the like; and may also be a digital signal processor (DSP), an application specific integrated circuit (ASIC), a field-programmable gate array (FPGA) or other programmable logic device, a discrete gate or transistor logic device, or a discrete hardware component.

It may be appreciated by those of ordinary skill in the art that all or some of the steps that implement the method embodiments described above may be accomplished by hardware related to computer programs. The aforementioned computer programs may be stored in a computer readable storage medium. The steps including the method embodiments in Embodiment 1 are performed when the program is executed; and the aforementioned storage media includes an ROM, an RAM, a magnetic disk, an optical disk, or any of other various media that can store program codes.

In summary, when the contiguous system addresses are parsed in the present disclosure, the algorithm consumes a fixed amount of time, which does not increase with the increase of the contiguous system address range, thus effectively improving the efficiency of contiguous system address parsing. Therefore, the present disclosure effectively overcomes various shortcomings of the prior art and has a high value for industrial application.

The above embodiments are merely illustrative of the principles of the present disclosure and effects thereof, and are not intended to limit the present disclosure. Any person skilled in the art may modify or change the above embodiments without departing from the spirit and scope of the present disclosure. Therefore, all equivalent modifications or changes made by those with general knowledge in the technical field without departing from the spirit and technical ideas disclosed in the present disclosure are still covered by the attached claims of the present disclosure.

What is claimed is:

1. A method for parsing contiguous system addresses, comprising:
   acquiring system level information upon receiving contiguous system addresses;
   acquiring logical address ranges of objects in a first level based on the contiguous system addresses and the system level information; and
   successively acquiring logical address ranges of objects in a second level, . . . , and an Nth level of the system by:
   acquiring logical address ranges of objects in a present level based on a logical address range of a previous level immediately prior to the present level and the system level information, wherein N is the number of levels, and N is an integer greater than or equal to 2, and the logical address ranges of the objects comprise start addresses and end addresses of the objects, wherein the system level information comprises the number of levels, interleaving enablement status of each of the levels, interleave granularity of each of the levels, and the numbers of objects contained in each of the levels.

2. The method for parsing contiguous system addresses according to claim 1, wherein acquiring logical address ranges of objects in a first level based on the contiguous system addresses and the system level information comprises:
   acquiring a start address of a first object in the first level based on a start address of the contiguous system addresses;
   acquiring start addresses of a second object, . . . , and an Mth object in the first level by obtaining logical addresses corresponding to physical addresses obtained by progressively increasing from the start address of the first object in the first level;
   acquiring an end address of the first object in the first level based on an end address of the contiguous system addresses; and
   acquiring end addresses of the second object, . . . , and the Mth object in the first level by obtaining logical addresses corresponding to physical addresses obtained by progressively deceasing from the end address of the first object in the first level, where M is the number of objects in the first level.

3. The method for parsing contiguous system addresses according to claim 2,
   wherein the progressively increasing from the start address of the contiguous system addresses comprises:
      in response to determining the interleaving enablement status of the first level is unenabled, progressively increasing from the start address of contiguous system addresses based on system configuration of each object and the contiguous system addresses; and
      in response to determining the interleaving enablement status of the first level is enabled, progressively increasing from the start address of the contiguous system addresses based on the interleave granularity of the first level and the contiguous system addresses;
   wherein the progressively deceasing from the end address of the contiguous system addresses comprises:
      in response to determining the interleaving enablement status of the first level is unenabled, progressively decreasing from the end address of the contiguous system addresses based on the system configuration of each object and the contiguous system addresses; and
      in response to determining the interleaving enablement status of the first level is enabled, progressively decreasing from the end address of the contiguous system addresses based on the interleave granularity of the first level and the contiguous system addresses.

4. The method for parsing contiguous system addresses according to claim 2, wherein in response to determining that a duplicate object is found in the first level by scanning or an acquired start address of a potential first-level object exceeds the end address of the contiguous system addresses, start address scanning of the first level is ended, at which time acquisition of the start addresses of the objects in the first level is completed.

5. The method for parsing contiguous system addresses according to claim 2, wherein in response to determining that a duplicate object is found in the first level by scanning or an acquired end address of a potential first-level object exceeds the start address of the contiguous system addresses, end address scanning of the first level is ended, at which time acquisition of the end addresses of the objects in the first level is completed.

6. The method for parsing contiguous system addresses according to claim 1, wherein acquiring logical address ranges of objects in a present level based on a logical address range of a previous level immediately prior to the present level and the system level information comprises:
   acquiring a start address of a first object in the present level based on a start address of a logical address range of the previous level;
   acquiring start addresses of a second object, . . . , and a Kth object in the present level by obtaining addresses in the present level corresponding to addresses in the previous level obtained by progressively increasing from the start address of the logical address range of the previous level;
   acquiring an end address of the first object in the present level based on an end address of the logical address range of the previous level; and
   acquiring end addresses of the second object, . . . , and the Kth object in the present level by obtaining addresses in the present level corresponding to addresses in the previous level obtained by progressively deceasing from the end address of the logical address range of the previous level, where K is the number of objects in the present level.

7. The method for parsing contiguous system addresses according to claim 6, wherein the progressively increasing from the start address of the logical address range of the previous level comprises:
   in response to determining the interleaving enablement status of the present level is unenabled, progressively increasing from the start address of the logical address range of the previous level based on system configuration of each object in the present level; and
   in response to determining the interleaving enablement status of the present level is enabled, progressively increasing from the start address of the logical address range of the previous level based on the interleave granularity of the present level; and
wherein the progressively deceasing from the end address of the logical address range of the previous level comprises:
   in response to determining the interleaving enablement status of the present level is unenabled, progressively decreasing from the end address of the logical address range of the previous level based on the system configuration of each object in the present level; and
   in response to determining the interleaving enablement status of the present level is enabled, progressively decreasing from the end address of the logical address range of the previous level based on the interleave granularity of the present level.

8. The method for parsing contiguous system addresses according to claim 6, wherein in response to determining that a duplicate object is found in the present level by scanning or an acquired start address of a potential present-level object exceeds the end address of the logical address range of the previous level, start address scanning of the present level is ended, at which time acquisition of the start addresses of the objects in the present level is completed.

9. The method for parsing contiguous system addresses according to claim 6, wherein in response to determining that a duplicate object is found in the present level by scanning or an acquired end address of a potential present-level object exceeds the start address of the logical address range of the previous level, end address scanning of the present level is ended, at which time acquisition of the end addresses of the objects in the present level is completed.

10. The method for parsing contiguous system addresses according to claim 3, further comprising:
in response to determining that the start address of the contiguous system addresses is not an integer multiple of the interleave granularity of the first level, configuring a first intermediate address by performing incrementation starting from the start address of the contiguous system addresses until reaching an integer multiple of the interleave granularity of the first level, and then designating the first intermediate address as the start address of the first object in the first level.

11. The method for parsing contiguous system addresses according to claim 3, further comprising:
in response to determining that the end address of the contiguous system addresses is not equal to an integer multiple of the interleave granularity of the first level minus 1, configuring a second intermediate address by performing decrementation starting from the end address of the contiguous system addresses until reaching an integer multiple of the interleave granularity of the first level, and then designating the second intermediate address as the end address of the first object in the first level.

12. An apparatus for parsing contiguous system addresses, comprising:
a system level information acquisition module configured to acquire system level information upon receiving contiguous system addresses; and
a logical address range acquisition module configured to acquire logical address ranges of objects in a first level based on the contiguous system addresses and the system level information, and successively acquire logical address ranges of objects in a second level, . . . , and an Nth level of the system by acquiring logical address ranges of objects in a present level based on a logical address range of a previous level immediately prior to the present level and the system level information, wherein N is the number of levels, and N is an integer greater than or equal to 2, wherein the logical address ranges of the objects comprise start addresses and end addresses of the objects, wherein the system level information comprises the number of levels, interleaving enablement status of each of the levels, interleave granularity of each of the levels, and the numbers of objects contained in each of the levels.

13. The apparatus for parsing contiguous system addresses according to claim 12, wherein the logical address range acquisition module comprises:
a start address acquisition unit configured to acquire a start address of a first object in the first level based on a start address of the contiguous system addresses, acquire start addresses of a second object, . . . , and an Mth object in the first level by obtaining logical addresses corresponding to physical addresses obtained by progressively increasing from the start address of the contiguous system addresses, acquire a start address of a first object in the present level based on a start address of a logical address range of the previous level, and acquire start addresses of a second object, . . . , and a Kth object in the present level by obtaining addresses in the present level corresponding to addresses in the previous level obtained by progressively increasing from the start address of the logical address range of the previous level, wherein M is the number of objects in the first level, and K is the number of objects in the present level; and
an end address acquisition unit configured to acquire an end address of the first object in the first level based on an end address of the contiguous system addresses, acquire end addresses of the second object, . . . , and the Mth object in the first level by obtaining logical addresses corresponding to physical addresses obtained by progressively deceasing from the end address of the contiguous system addresses, acquire an end address of the first object in the present level based on an end address in the logical address range of the previous level, and acquire end addresses of the second object, . . . , and the Kth object in the present level obtaining addresses in the present level corresponding to addresses in the previous level obtained by progressively deceasing from the end address of the logical address range of the previous level.

14. The apparatus for parsing contiguous system addresses according to claim 13,
wherein in the start address acquisition unit,
when the interleaving enablement status of the first level is unenabled, the progressively increasing from the start address of the contiguous system addresses is based on system configuration of each object in the first level and the contiguous system addresses;
when the interleaving enablement status of the first level is enabled, the progressively increasing from the start address of the contiguous system addresses is based on the interleave granularity of the first level and the contiguous system addresses;
when the interleaving enablement status of the present level is unenabled, the progressively increasing from the start address of the logical address range of the previous level is based on system configuration of each object in the present level and logical addresses of the previous level; and
when the interleaving enablement status of the present level is enabled, the progressively increasing from the start address of the logical address range of the previous level is based on the interleave granularity of the present level; and
wherein in the end address acquisition unit,
when the interleaving enablement status of the first level is unenabled, the progressively decreasing from the end address of the contiguous system addresses is based on the system configuration of each object in the first level and the contiguous system addresses;
when the interleaving enablement status of the first level is enabled, the progressively decreasing from the end address of the contiguous system addresses is based on the interleave granularity of the first level and the contiguous system addresses;
when the interleaving enablement status of the present level is unenabled, the progressively decreasing from the end address of the logical address range of the previous level is based on the system configuration of each object in the present level and; and
when the interleaving enablement status of the present level is enabled, the progressively decreasing from the end address of the logical address range of the previous level is based on the interleave granularity of the present level and.

15. The apparatus for parsing contiguous system addresses according to claim 13, wherein the logical address range acquisition module further comprises:
  a start address scanning unit configured to acquire the start addresses of the second object, . . . , and the Mth object in the first level by scanning,
    wherein when a duplicate object is found in the first level by scanning or an acquired start address of an object exceeds the end address of the contiguous system addresses, the start address scanning of the first level ends, at which time acquisition of the start addresses of the objects in the first level is completed,
    wherein the start address scanning unit is further configured to successively acquire the start addresses of the second object, . . . , and the Kth object in the present level by scanning, wherein when a duplicate object is found in the present level by scanning or the acquired start address of an object exceeds the end address in the logical address range of the previous level, start address scanning of the present level ends, at which time the acquisition of the start addresses of the objects in the present level is completed; and
  an end address scanning unit configured to successively acquire the end addresses of the second object, . . . , and the Mth object in the first level by scanning,
    wherein when a duplicate object is found in the first level by scanning or an acquired end address of an object exceeds the start address of the contiguous system addresses, end address scanning of the first level ends, at which time acquisition of the end addresses of the objects in the first level is completed,
    wherein the end address scanning unit is further configured to successively acquire the end addresses of the second object, . . . , and the Kth object in the present level by scanning, wherein when a duplicate object is found in the present level by scanning or an acquired end address of an object exceeds the start address of the logical address range of the previous level, end address scanning of the present level ends, at which time acquisition of the end addresses of the objects in the present level is completed.

16. The apparatus for parsing contiguous system addresses according to claim 13, wherein the logical address range acquisition module further comprises:
  a multiple detection unit configured to detect whether the start address of the contiguous system addresses or the logical address range of the previous level is an integer multiple of the interleave granularity of the corresponding level, and whether the end address of the contiguous system addresses or the logical address range of the previous level is an integer multiple of the interleave granularity of the corresponding level; and
  a multiple adjustment unit configured to, when the start address of the contiguous system addresses or the logical address range of the previous level is not an integer multiple of the interleave granularity of the corresponding level, increase from the address until reaching an integer multiple of the interleave granularity of the level; when the start address of the contiguous system addresses or the logical address range of the previous level is an integer multiple of the interleave granularity of the corresponding level, decrease from the address until reaching an integer multiple of the interleave granularity of the level.

17. An electronic device, comprising a memory configured to store a computer program; and a processor configured to execute the computer program to implement a method for parsing contiguous system addresses, which comprises:
  acquiring system level information upon receiving contiguous system addresses;
  acquiring logical address ranges of objects in a first level based on the contiguous system addresses and the system level information; and
  successively acquiring logical address ranges of objects in a second level, . . . , and an Nth level of the system by acquiring logical address ranges of objects in a present level based on a logical address range of a previous level immediately prior to the present level and the system level information, where N is the number of levels, and N is an integer greater than or equal to 2, and the logical address ranges of the objects comprise start addresses and end addresses of the objects, wherein the system level information comprises the number of levels, interleaving enablement status of each of the levels, interleave granularity of each of the levels, and the numbers of objects contained in each of the levels.

* * * * *